United States Patent
Van Lieshout et al.

(10) Patent No.: US 9,661,533 B2
(45) Date of Patent: May 23, 2017

(54) HANDOVER WITH CARRIER AGGREGATION

(75) Inventors: Gert Jan Van Lieshout, Apeldoorn (NL); Himke Van Der Velde, Zwolle (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/696,475

(22) PCT Filed: Apr. 27, 2011

(86) PCT No.: PCT/KR2011/003115
§ 371 (c)(1),
(2), (4) Date: Nov. 6, 2012

(87) PCT Pub. No.: WO2011/142544
PCT Pub. Date: Nov. 17, 2011

(65) Prior Publication Data
US 2013/0058245 A1  Mar. 7, 2013

(30) Foreign Application Priority Data
May 11, 2010  (GB) .................................. 1007869.9

(51) Int. Cl.
*H04W 36/00* (2009.01)
*H04W 36/08* (2009.01)
(Continued)

(52) U.S. Cl.
CPC ....... *H04W 36/0083* (2013.01); *H04W 24/10* (2013.01); *H04W 36/0094* (2013.01);
(Continued)

(58) Field of Classification Search
CPC . H04W 24/10; H04W 36/30; H04W 36/0083; H04L 5/001; H04L 5/0098
(Continued)

(56) References Cited

U.S. PATENT DOCUMENTS 7,453,912 B2 * 11/2008 Laroia et al. ................. 370/526
7,477,920 B2 *  1/2009 Scheinert .............. H04W 24/02
                                                    455/423
(Continued)

FOREIGN PATENT DOCUMENTS

CA   2 706 057 A1   5/2009
CN   101547486 A    9/2009
(Continued)

OTHER PUBLICATIONS

Samsung, "Handover-stage 2 level issues", 3GPP TSG-RAN#69bis meeting, Beijing, P.R. China, Apr. 12-16, 2010, 6 pages.*
(Continued)

*Primary Examiner* — Mounir Moutaouakil
(74) *Attorney, Agent, or Firm* — Jefferson IP Law, LLP

(57) ABSTRACT

A handover with carrier aggregation is provided. A method of assisting handover of a user equipment from a source wireless access node to a target wireless access node, for use in a wireless access network having a plurality of carrier frequencies and a plurality of cells in which a cell and a carrier frequency may be configured as a component carrier, and in which at least two component carriers may be aggregated for communication between the user equipment and the source wireless access node, the aggregated component carriers comprising a primary component carrier and at least one secondary component carrier comprises the step of selecting, at the source wireless access node, a first carrier frequency to be configured as a primary component carrier for communication with the target wireless access node after handover, and selecting, at the target wireless access node, a second carrier frequency to be configured as a secondary component carrier for communication with the target wireless access node after handover.

34 Claims, 5 Drawing Sheets

(51) Int. Cl.
*H04W 24/10* (2009.01)
*H04W 48/20* (2009.01)
*H04W 36/04* (2009.01)
*H04W 48/02* (2009.01)

(52) U.S. Cl.
CPC ........... *H04W 36/04* (2013.01); *H04W 36/08* (2013.01); *H04W 48/20* (2013.01); *H04W 48/02* (2013.01)

(58) Field of Classification Search
USPC .................................................. 370/252, 331
See application file for complete search history.

(56) References Cited

U.S. PATENT DOCUMENTS

| | | | | |
|---|---|---|---|---|
| 7,706,798 | B2* | 4/2010 | Hurst | H04W 36/0083 370/331 |
| 7,809,373 | B2* | 10/2010 | Park | H04W 74/006 370/338 |
| 8,213,939 | B2* | 7/2012 | Iwamura | H04W 12/04 370/331 |
| 8,259,680 | B2* | 9/2012 | Pica et al. | 370/331 |
| 8,660,559 | B2* | 2/2014 | Tamura | H04W 24/10 455/436 |
| 8,699,459 | B2* | 4/2014 | Jung et al. | 370/331 |
| 8,730,881 | B2* | 5/2014 | Fang | H04W 36/08 370/280 |
| 8,781,480 | B2* | 7/2014 | Lim | H04W 36/04 370/331 |
| 8,804,586 | B2* | 8/2014 | Fong | H04L 5/0053 370/311 |
| 8,811,350 | B2* | 8/2014 | Chung | H04J 11/0093 370/280 |
| 8,873,505 | B2* | 10/2014 | Zhang | H04L 5/0035 370/329 |
| 9,036,607 | B2* | 5/2015 | Uemura | H04W 24/10 370/332 |
| 2005/0124345 | A1 | 6/2005 | Laroia et al. | |
| 2007/0184838 | A1 | 8/2007 | Van Der Velde et al. | |
| 2008/0039092 | A1 | 2/2008 | Kitazoe | |
| 2008/0069053 | A1* | 3/2008 | Kim et al. | 370/332 |
| 2008/0200171 | A1* | 8/2008 | Jeong et al. | 455/436 |
| 2008/0267131 | A1* | 10/2008 | Kangude | H04W 36/0072 370/331 |
| 2009/0005029 | A1* | 1/2009 | Wang | H04W 24/10 455/423 |
| 2009/0239537 | A1 | 9/2009 | Iwamura et al. | |
| 2009/0239570 | A1* | 9/2009 | Koyanagi | H04W 36/0077 455/525 |
| 2009/0270107 | A1* | 10/2009 | Lee | H04W 36/04 455/450 |
| 2010/0120431 | A1* | 5/2010 | Hwang et al. | 455/436 |
| 2010/0222060 | A1* | 9/2010 | Zhang et al. | 455/436 |
| 2010/0322079 | A1* | 12/2010 | Kitazoe et al. | 370/241 |
| 2011/0149912 | A1* | 6/2011 | Jung et al. | 370/331 |
| 2011/0170418 | A1* | 7/2011 | Sagfors | H04W 36/0083 370/241 |
| 2011/0212693 | A1* | 9/2011 | Sagfors | H04W 36/0083 455/67.11 |
| 2012/0026977 | A1 | 2/2012 | Kim et al. | |
| 2012/0026980 | A1* | 2/2012 | Gao | H04W 36/0077 370/331 |
| 2012/0094608 | A1 | 4/2012 | Shi et al. | |
| 2013/0010716 | A1* | 1/2013 | Dinan | 370/329 |
| 2013/0022026 | A1* | 1/2013 | Ishii et al. | 370/332 |
| 2014/0126547 | A1* | 5/2014 | Tamura et al. | 370/332 |
| 2014/0192771 | A1* | 7/2014 | Jung et al. | 370/331 |

FOREIGN PATENT DOCUMENTS

| | | | |
|---|---|---|---|
| EP | 1 773 009 | A2 | 4/2007 |
| EP | 2 190 241 | A1 | 5/2010 |
| EP | 2 534 883 | A2 | 8/2011 |
| EP | 2 443 867 | A2 | 4/2012 |
| EP | 2 448 312 | A1 | 5/2012 |
| EP | 2 453 694 | A1 | 5/2012 |
| EP | 2 517 499 | A1 | 10/2012 |
| EP | 2 569 979 | A2 | 3/2013 |
| JP | 2005-347979 | A | 12/2005 |
| KR | 10-2006-0059377 | A | 6/2006 |
| RU | 2008 119 076 | A | 12/2009 |
| WO | 2009/149665 | A1 | 12/2009 |
| WO | 2010/024591 | A2 | 3/2010 |
| WO | 2010/083653 | A1 | 7/2010 |
| WO | 2010/104335 | A2 | 9/2010 |
| WO | 2010/106735 | A1 | 9/2010 |
| WO | 2010/108320 | A1 | 9/2010 |
| WO | WO/2010/126418 | * | 11/2010 ............ H04W 48/12 |
| WO | 2010/140797 | A2 | 12/2010 |
| WO | 2010/148961 | A1 | 12/2010 |
| WO | 2011/018033 | A1 | 2/2011 |
| WO | 2011/041985 | A1 | 4/2011 |
| WO | 2011/074200 | A1 | 6/2011 |
| WO | 2011/079210 | A1 | 6/2011 |
| WO | 2011/082988 | A1 | 7/2011 |
| WO | 2011/099634 | A1 | 8/2011 |
| WO | 2011/122045 | A1 | 10/2011 |

OTHER PUBLICATIONS

Huawei, "Carrier aggregation in active mode", 3GPP TSG-RAN Meeting #66, San Francisco, USA, May 4-8, 2009, 4 pages.*
MediaTek Inc., "Handover with Carrier Aggregation", 3GPP TSG-RAN WG2 #69, San Francisco, USA, Feb. 22-26, 2010, 6 pages.*
Potevio, "Inter-eNB handover for Carrier Aggregation", 3GPP TSG-RAN WG2#70, Montreal, Canada, May 10-14, 2010, 2 pages.*
Huawei, Intra LTE-A UE Handover Procedure inter-eNB for CA, 3GPP TSG RAN WG2 Meeting #67 R2-094731, 24 Aug. 24, 2009.
Huawei, "Carrier Aggregation in Active Mode", R2-093104, 3Gpp TSG-RAN WG2 Meeting #66, San Francisco, USA, May 4-8, 2009.
Interdigital Communications, Editorial proposals to the CA RRC CR, 3GPP TSG-RAN WG2 #71bis, R2-105707, Oct. 11, 2010, Xian, China.
Potevio, Inter- eNB handover for Carrier Aggregation, 3GPP TSG RAN WG2 #70, May 1, 2010, Montreal, Canada.
Samsung, Additional measurement support, 3GPP TSG-RAN2#70 meeting, R2-103116, May 4, 2010, Montreal, Canada.
Huawei, Consideration on CA handover, 3GPP TSG-RAN WG2#70, R2-103183, May 4, 2010, Montreal, Canada.
Intel Corporation (UK) LTD, PCC change and clarification on CC pre-configuration during inter-eNB HO, 3GPP TSG RAN WG2#69, R2-103040, May 4, 2010, Montreal, Canada.
ZTE et al., Decision on Pcell/Scell during handover, 3GPP TSG RAN WG2#70, R2-102812, May 4, 2010, Montreal, Canada.
Samsung, Handover with CA—stage 2 level issues, 3GPP TSG-RAN2#70 meeting, R2-103113, Montreal, Canada, May 3, 2010.
Alcatel-Lucent, Alcatel-Lucent Shanghai Bell, Handover procedure in CA, TSG-RAN WG2#70, R2-103155, Montreal, Canada, May 3, 2010.

* cited by examiner

HANDOVER WITH CARRIER AGGREGATION

TECHNICAL FIELD

The present invention relates generally to wireless networks, and more specifically to a method and apparatus for assisting handover in systems in wireless networks employing carrier aggregation.

BACKGROUND ART

Wireless networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards. WiMax systems using radio access technology to IEEE 802.16 also offer improvements over previous standards.

DISCLOSURE OF INVENTION

Technical Problem

Modern wireless networks such as LTE and WiMax typically employ a modulation format such as Orthogonal Frequency Division Multiplexing (OFDM), which is applied to one or more carriers, and is used to provide radio resource that is allocated to links between a base station (in 3GPP terminology an eNB (E-UTRA Network Node B)) and one or more user equipments. Typically radio resource to connect a user equipment to a base station is allocated from one carrier. As an enhancement, it is proposed to aggregate two or more carriers to provide yet more capacity, and more flexible allocation of radio resource. Carrier aggregation may also be employed by wireless systems other than LTE or WiMax.

Methods and apparatus are required to assist handover in wireless systems employing carrier aggregation.

Solution to Problem

In accordance with a first aspect of the present invention, there is provided a method of assisting handover of a user equipment from a source wireless access node to a target wireless access node, for use in a wireless access network having a plurality of carrier frequencies and a plurality of cells in which a cell and a carrier frequency may be configured as a component carrier, and in which at least two component carriers may be aggregated for communication between the user equipment and the source wireless access node, the aggregated component carriers comprising a primary component carrier and at least one secondary component carrier, the method comprising:

selecting, at the source wireless access node, a first carrier frequency to be configured as a primary component carrier for communication with the target wireless access node after handover; and selecting, at the target wireless access node, a second carrier frequency to be configured as a secondary component carrier for communication with the target wireless access node after handover.

An advantage of selecting, at the target wireless access node, a second carrier frequency to be configured as a secondary component carrier for communication with the target wireless access node after handover is that is that the target wireless access node may have information relating to resource availability at candidate frequencies and/or cells.

Preferably the method comprises selecting, at the source wireless access node, a cell for configuration as the primary component carrier for communication with the target wireless access node after handover. An advantage of selecting a cell for configuration as the primary component carrier at the source wireless node is that the role of the primary component carrier with regard to security key derivation is facilitated.

Preferably, the method comprises:

selecting, at the source wireless access node, a cell for configuration as the secondary component carrier for communication with the target wireless access node after handover. This has the advantage that loading of the cell may be taken into consideration in the selection.

Preferably, the method comprises:

providing measurement information from the source wireless access node to the target wireless access node relating to the selected cell.

Preferably, the method comprises:

providing measurement information from the source wireless access node to the target wireless access node relating to the carrier frequency configured as the selected secondary component carrier.

Preferably, the measurement information comprises a list of items of information, each item relating to a combination of a cell and a carrier frequency, and the method comprises:

determining a signal measurement parameter for each item of information;

arranging the items in the list in order, the order being dependent on the signal measurement parameter of each item.

Preferably, the method comprises:

selecting, at the target wireless access node, a cell for communication with the target wireless access node for configuration as the secondary component carrier after handover.

Preferably, the method comprises:

providing measurement information from the source wireless access node to the target wireless access node relating to a cell or cells at the second carrier frequency.

In accordance with a second aspect of the invention there is provided a method of reporting measurements from a user equipment for use in a wireless access network having a plurality of carrier frequencies, the method comprising:

receiving a first message at the user equipment comprising an indicator, said indicator comprising an indication that a measurement report is required by the wireless access network;

generating a trigger at the user equipment in dependence on a measurement result relating to a first carrier frequency; and dependent on the trigger and receiving the first message, sending a second message from the user equipment to the wireless access network conveying said measurement report, wherein said measurement report relates at least to a carrier frequency other than the first carrier frequency.

In an embodiment of the invention, said indicator indicates that the measurement report is required to relate to at least a carrier frequency other than the first carrier frequency.

This has an advantage that the user equipment may operate in a mode appropriate to carrier aggregation in response to receipt of said indicator.

Preferably, said measurement report comprises measurements of carrier frequencies that the user equipment is configured to measure. This has an advantage that extra measurements may not be required to be taken.

In an embodiment of the invention, said measurement report excludes one or more carrier frequency at which it has been determined that a best cell may not be identified.

This has an advantage that said measurement report may exclude measurements that may not be required by some aspects of a handover process, since they may not be associated with an indication of a best cell.

Preferably the exclusion is based on whether signals are measured at least in a neighbouring cell. It may be necessary to measure signals in a neighbouring cell to a serving cell in order to determine a best cell.

In an embodiment of the invention, said measurement report excludes one or more carrier frequencies for which signals are measured only from a serving cell. Carrier frequencies for which signals are measured only from a serving cell may not be suitable for determining a best cell.

In an embodiment of the invention, said measurement report comprises measurements of all carrier frequencies that the user equipment is configured to measure. This has an advantage that a simple indicator may indicate that all carrier frequencies that the user equipment is configured to measure should be included in a measurement report, without a need to use signalling resources listing required carrier frequencies.

In an embodiment of the invention, the method comprises determining at the user equipment a selected cell for each carrier frequency included in said measurement report, and including in the measurement report each selected cell.

Preferably, each selected cell is a best cell for a respective carrier frequency. This has an advantage that a best cell may be indicated to the network, which may be useful in support of handover.

In embodiments of the invention, the method comprises determining at the user equipment the selected cell for each carrier frequency on the basis of a measurement of a determined measurement quantity, wherein the determined measurement quantity is a received signal power if more than one measurement quantity is configured at the user equipment for a respective carrier frequency. This has an advantage that it is clear which measurement quantity (that is to say typically a measure of signal quality or signal strength) should be used to select a selected cell, which may be a best cell.

In embodiments of the invention, the method further comprises determining at the user equipment a plurality of selected cells for a carrier frequency on a basis of measurements of the determined measurement quantity, wherein the plurality of selected cells are included in said measurement report in an order derived from measurements of the determined measurement quantity. This has an advantage that the order may indicate to the network the relative merit of the selected cells, for example the best cell may appear first on the list. This information may be useful for example for handover preparation.

In embodiments of the invention, said indicator comprises an indication of carrier frequencies for which the user equipment is required to include measurements in said measurement report. This has an advantage that the network may determine the content of the measurement report according to its requirements.

In embodiments of the invention, said indicator comprises a number of cells, and the user equipment is required to include measurements in said measurement report relating to selected cells, the number of selected cells for a respective carrier frequency being the number of cells or fewer.

In an embodiment of the invention, the first carrier frequency is not configured for use for communication between the user equipment and the wireless access network.

In an embodiment of the invention, the method comprises configuring the user equipment such that said measurement report comprises measurements of a first quantity and not of a second quantity. This has an advantage that the user equipment may be configured to include only a quantity that is required in a measurement report, if multiple quantities are available.

In an embodiment of the invention, the method comprises using an existing configuration of the user equipment to determine whether the measurement report comprises measurements of a first quantity or a second quantity. This has the advantage that signalling to indicate a quantity for inclusion in the measurement report may not be required.

In an embodiment of the invention, said indicator indicates a measurement quantity that is required by the wireless access network and said measurement report conveyed from the user equipment to the wireless access network comprises a measurement of a first quantity and not a measurement of a second quantity related to the first carrier frequency. This has an advantage that the network may indicate to the user equipment that it should include only the quantity that is required by the network in the measurement report, if multiple quantities are available.

In an embodiment of the invention, the first quantity relates to received signal power, and the second quantity relates to received signal quality.

In an alternative embodiment of the invention, the first quantity relates to received signal quality, and the second quantity relates to received signal power.

In an embodiment of the invention, the method further comprises receiving a message at the user equipment comprising an indication of a threshold and sending the second message in dependence on the measurement result exceeding the threshold.

According to a third aspect of the invention there is provided user equipment for use in a wireless access network having a plurality of carrier frequencies, the user equipment being arranged to:

receive a first message comprising an indicator, said indicator comprising an indication that a measurement report is required by the wireless access network;

generate a trigger in dependence on a measurement result relating to a first carrier frequency; and dependent on the trigger and receiving the first message, send a second message to the wireless access network conveying the measurement report indicated by the indicator, wherein the measurement report indicated by the indicator relates at least to a carrier frequency other than the first carrier frequency.

In accordance with a fourth aspect of the invention there is provided a method of assisting handover, for use in a wireless access network having a plurality of carrier frequencies and a plurality of cells, in which a cell and a carrier frequency may be configured as a component carrier, and in which at least two component carriers may be aggregated for communication, the aggregated component carriers comprising a primary component carrier and at least one secondary component carrier, the method comprising:

configuring the user equipment before handover to perform a measurement linked to a first measurement identification, the measurement comparing a quantity at a first carrier frequency configured as the primary component carrier or the secondary component carrier with a quantity at a second carrier frequency at a neighbour frequency of the first carrier frequency; and dependent on handover and dependent the second frequency being configured as the primary or secondary component carrier after handover, re-configuring the user equipment to perform a measurement linked to the first measurement identification, the measurement comparing a quantity at the second carrier frequency configured as the primary component carrier or the secondary component carrier with a quantity at the first carrier frequency. This has an advantage that reconfiguration may be performed autonomously, minimising signalling requirements.

Preferably, the method comprises re-configuring the user equipment to perform a measurement at a carrier frequency other than the first carrier frequency dependent on communication from the wireless access network.

In accordance with a fifth aspect of the invention, there is provided user equipment for use in a wireless access network having a plurality of carrier frequencies and a plurality of cells, in which a cell and a carrier frequency may be configured as a component carrier, and in which at least two component carriers may be aggregated for communication, the aggregated component carriers comprising a primary component carrier and at least one secondary component carrier, the method comprising:

configuring the user equipment before handover to perform a measurement linked to a first measurement identification, the measurement comparing a quantity at a first carrier frequency configured as the primary component carrier or the secondary component carrier with a quantity at a second carrier frequency at a neighbour frequency of the first carrier frequency; and dependent on handover and dependent the second frequency being configured as the primary or secondary component carrier after handover, re-configuring the user equipment to perform a measurement linked to the first measurement identification, the measurement comparing a quantity at the second carrier frequency configured as the primary component carrier or the secondary component carrier with a quantity at the first carrier frequency.

Further features and advantages of the invention will be apparent form the following description of preferred embodiments of the invention, which are given by way of example only.

Advantageous Effects of Invention

An advantage of selecting, at the target wireless access node, a second carrier frequency to be configured as a secondary component carrier for communication with the target wireless access node after handover is that is that the target wireless access node may have information relating to resource availability at candidate frequencies and/or cells.

MODE FOR THE INVENTION

By way of example an embodiment of the invention will now be described in the context of a wireless network including a radio access network supporting communication using E-UTRA/LTE radio access technology, as associated with E-UTRA networks. However, it will be understood that this is by way of example only and that other embodiments may involve wireless networks using other radio access technologies, such as IEEE802.16 WiMax systems; embodiments are not limited to the use of a particular radio access technology.

Initial deployments of LTE systems (in the LTE specifications in Release 8/9), the User Equipment (UE) is typically only connected to one cell, on one frequency, i.e. on one carrier. With the arrival of carrier aggregation, this situation changes, and the user equipment may be connected to one Primary Component Carrier (PCC) and one or more Secondary Component Carriers (SCCs). Suitable continuation of the different component carrier needs to be arranged at intra-LTE handover, that is to say from one LTE cell to another LTE cell. It is preferable to determine whether the Primary Component Carrier should be changed, and if so, which node will decide which component carrier becomes the new Primary Component Carrier, what will be done with the Secondary Component Carriers, that is to say should they be continued, released or replaced by other component carriers, and what will be done with the measurement configuration that is configured at the user equipment at such a carrier aggregation handover.

Figure 1:
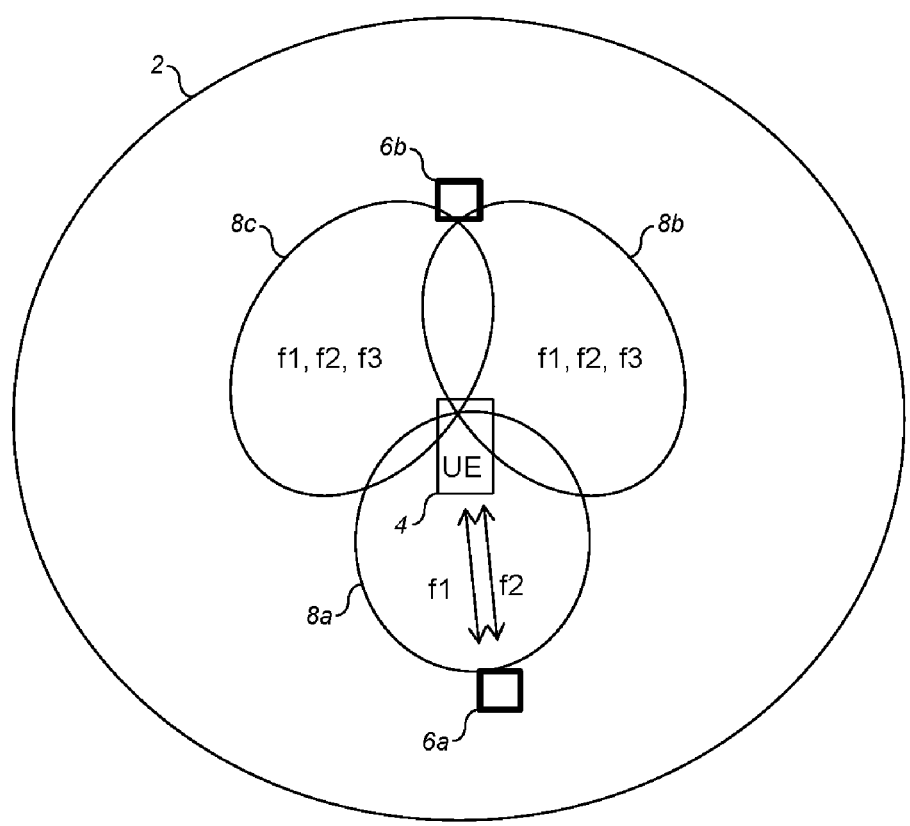
FIG. 1 is a schematic diagram illustrating a wireless access network featuring component carrier aggregation.

FIG. 1 shows a wireless access network 2 featuring component carrier aggregation. Two wireless access nodes are shown, typically eNBs (EUTRAN node B) in the LTE system, a source wireless access node 6a, from which the user equipment 4 may be handed over, and a target wireless access node 6b, to which the wireless access node may be handed over. The source eNB 6a has an associated coverage sector 8a, shown, and target eNB 6b has associated coverage sectors 8b and 8c shown. In each coverage sector, a frequency f1, f2, or f3 may be available. A cell may correspond to a coverage sector used at a particular frequency.

In order to explain the advantages of embodiments of the invention when applied to a system employing carrier aggregation, handover procedures will first be described for systems not employing carrier aggregation, such as for example LTE release 8/9 systems. Typically, in conventional systems, the network controls the mobility of a user equipment that is in connected mode (or, to be precise in RRC_CONNECTED state) i.e. the network decides with which cell the user equipment should maintain the radio connection (also referred to as the serving cell). The network typically applies the handover procedure to move the user equipment from one cell, the serving cell, to another cell, the target cell. The network typically decides the cell and the radio Access Technology (RAT) to which the user equipment should connect typically based on radio quality, but it may also take into account other factors e.g. cell load, user equipment capabilities, the type of bearers that are (being) established. To assist the handover decision process, the network normally configures the user equipment to perform measurements on the serving frequency, on other E-UTRA frequencies (referred to as inter-frequency measurements) and/ or on frequencies used by other Radio Access Technologies (referred to as inter-RAT measurements).

In LTE networks, there may be two types of handover from one LTE cell to another LTE cell (i.e. intra-LTE handovers). X2 handover is a high performance and simple procedure, but requires a direct interface between source and target eNB. Alternatively, S1 handover may offer somewhat lower performance and may be more complex, but can be used even if no direct interface exists between source and target eNB (for example via a S1 link).

The X2 handover will now be described in more detail, for a system not employing carrier aggregation in order to illustrate shortcomings that may arise if carrier aggregation is introduced. Similar shortcomings may be present in the S1 handover case and thus embodiments of the invention may be applicable to both the X2 and S1 handover.

The overall X2 handover procedure is described by reference to FIG. 2, which illustrates Intra-MME/Serving Gateway Handover. Particularly relevant steps of the handover procedure are as follows.

At Step 2, the user equipment sends a measurement report to the source eNB that it has detected a neighbouring cell that meets the measurement report triggering criteria. Based on the provided measurement information and other knowledge present in the source eNB, the source eNB can now decide whether to start a handover preparation or not.

At step 4, if the source eNB starts handover preparation, it will send a HANDOVER REQUEST message, to the target eNB. This message carries the handover preparation information within the HandoverPreparationInformation message and includes: the user equipment radio access capabilities; the current radio access (i.e. access stratum, AS) configuration; the Radio Resource Management (RRM) configuration, i.e. information kept only by the eNB that is used primarily for Radio Resource Management. Usage of the information is up to eNB implementation; the Radio Access (AS) context i.e. information kept only by the eNB and not exchanged across the radio interface, e.g. information needed to perform RRC connection re-establishment; and the target cell identification.

At Step 6, if the target eNB accepts the handover, it reserves the radio resources and decides the details of the radio access configuration to be used by the user equipment in the target cell. This configuration is returned to the source eNB within the HANDOVER REQUEST ACK message. This message carries the radio access configuration within the HandoverCommand message. The HandoverCommand message again carries an RRCConnectionReconfiguration message.

When used to perform a handover within E-UTRA, this message may include the radio access configuration to be used in the target cell. That is to say the message may include the measurement configuration, expressed by the delta, that is to say a difference, compared to the configuration used in the source cell (i.e. the target eNB indicating changes in the measurement configuration). The message may also comprise mobility control information, which may specify the target cell identity (by means of an cell identity) and characteristics (a frequency, a bandwidth and additional spectrum emission information, preferably if different from what is used in the source cell that is to say as a delta), the new radio access identity to be used in the target cell, the cell specific radio resource configuration (common for all user equipments), dedicated resources used for initial access in the target cell and a timer to limit the duration the user equipment tries connecting to the target cell.

The message may also include the user equipment-specific radio resource configuration (i.e. the dedicated radio configuration), also expressed as a delta, that is to say a difference, compared to the configuration used in the source cell, and the security configuration i.e. the algorithms, if different from the ones used in the source cell, as well as parameters affecting the derivation of radio access security keys (i.e. an indication whether a new base key is to be used and a counter that is incremented upon every handover).

At Step 7, when the source proceeds with the handover, it may start the execution phase, which may include the source eNB transparently forwarding a RRCConnectionReconfiguration message to the user equipment, that is to say it does not change the message contents. The source may however perform the integrity protection and ciphering of the message. The user equipment may attempt to connect to the target cell (steps 9, 10) and return the RRCConnectionReconfigurationComplete message.

Figure 3:
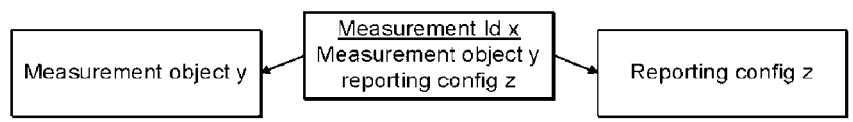
FIG. 3 is a schematic diagram illustrating linking of a measurement object and a reporting configuration to a measurement identification.

An explanation of the conventional measurement configuration in LTE and the handover of this configuration at handover will be given with reference to FIG. 3. Conventionally, the LTE measurement model consists of 3 main components: firstly, a measurement identity, which links a measurement reporting configuration to a measurement object; secondly a measurement object, which may specify a set of cells of a certain RAT type (e.g. all cells on an LTE frequency, a list of cells on a UMTS frequency, a list of GSM cells/frequencies, etc.); and thirdly, a measurement report configuration, which may indicate when the user equipment should trigger a measurement report as well as which information the user equipment should include in this report. A measurement report configuration may indicate that a report should be triggered in case a particular event occurs e.g. event A3: a neighbour cell becomes a certain offset better than the current serving cell, or it may indicate that periodical reporting is applicable, in which case the user equipment provides at regular intervals (up to a configurable number of times) a configurable number of cells in order of measurement result i.e. best cell first.

Figure 4:
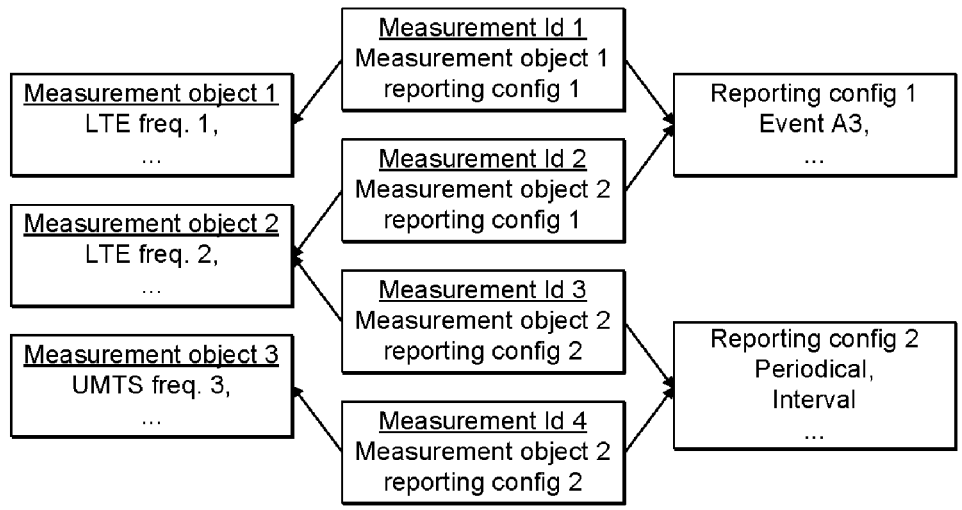
FIG. 4 is a schematic diagram showing an example of a measurement configuration.

FIG. 4 shows an example of a conventional measurement configuration at the user equipment, which demonstrates that it is possible to link multiple report configurations to the same object, and to link one report configuration to multiple objects. By smartly linking measurement objects and measurement report configurations multiple times, the signalling overhead can be minimised, e.g. by only defining a new measurement identity which links an existing measurement object to an existing report configuration, a new measurement is defined.

One conventional mechanism that may limit measurement configuration-related signalling at handover may be denoted as "object swapping". With object swapping it is meant that if the frequency of the serving cell changes, i.e. the serving cell was previously part of object1 and after the handover the new serving cell is part of object2, then before taking the measurement configuration update received in the handover command into account, the user equipment autonomously re-links. In particular, the user equipment may re-link all measurement identities previously referring to the old serving frequency to the new serving frequency, and all measurement identities previously referring to the new serving frequency to the old serving frequency.

Figure 2:
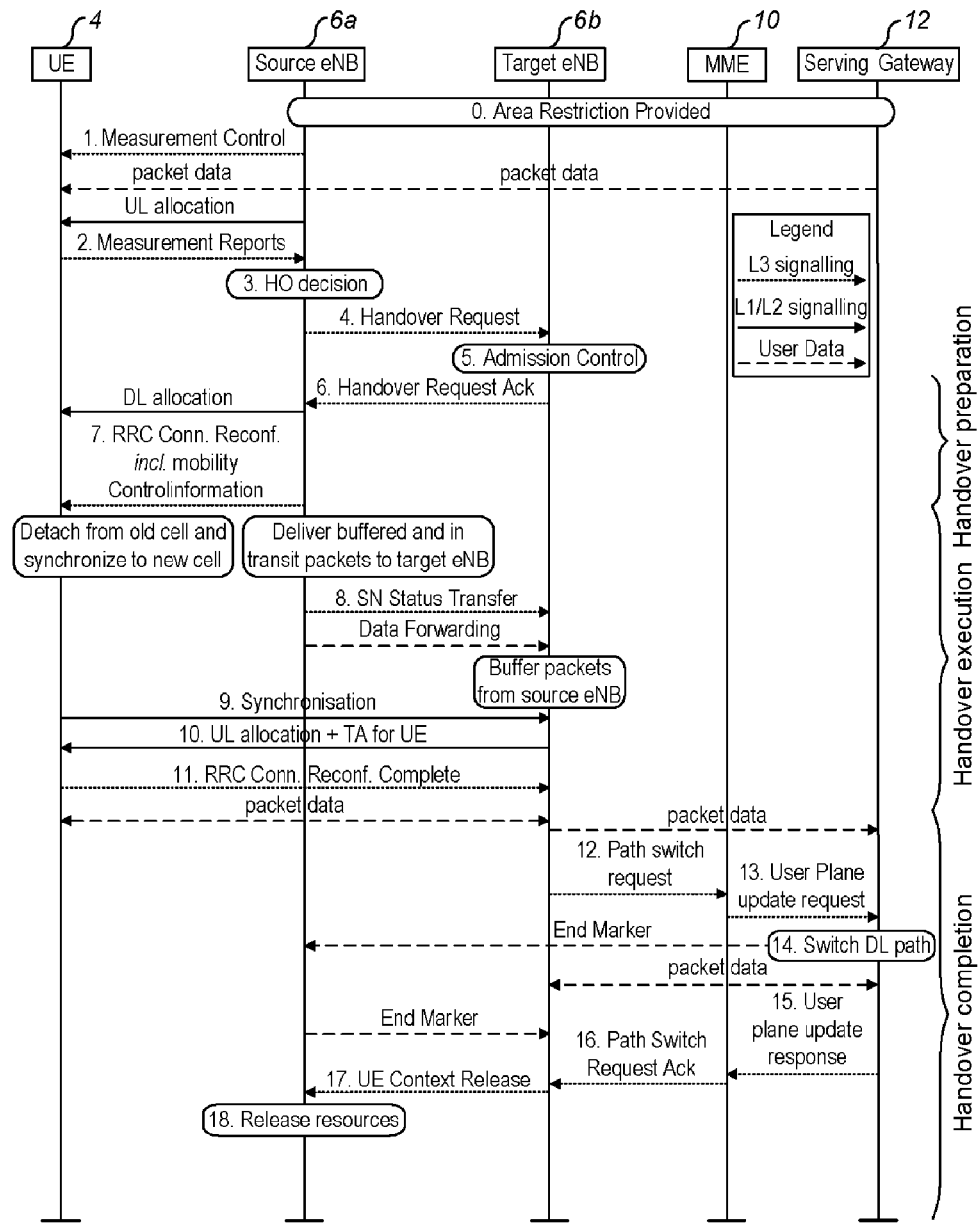
FIG. 2 is a schematic diagram illustrating signalling steps during handover.
Figure 5:
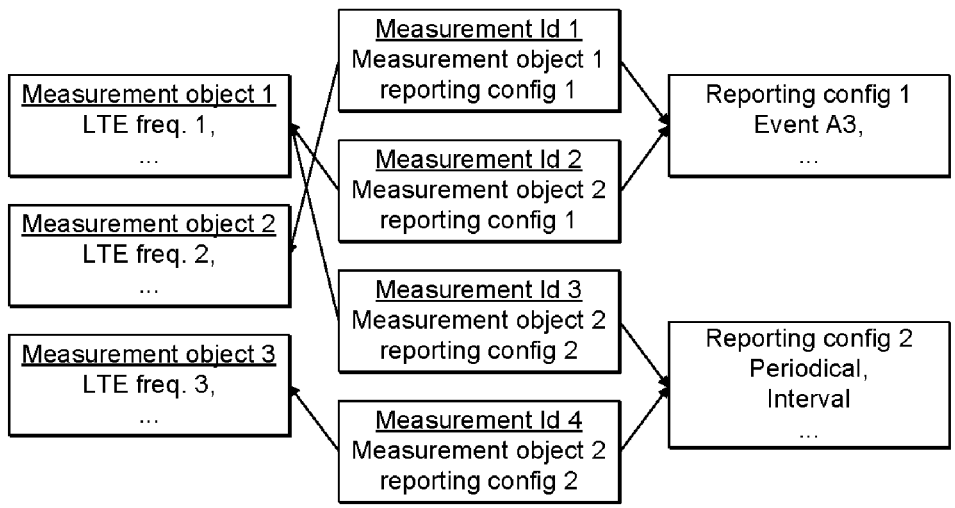
FIG. 5 is a schematic diagram showing an example of a measurement configuration after an autonomous update.

The result of this process is shown in FIG. 5, which illustrates the measurement model of FIG. 2, but now after the autonomous update of the user equipment, assuming that before the handover the serving cell corresponds with measurement object 1 (freq1), while after the handover it corresponds with measurement object 2 (freq2). Note that with this object swapping, it is possible to continue (without explicit signalling) the most important measurements i.e. the measurements for intra-frequency mobility on the serving frequency at the new serving frequency.

Having described the conventional handover process in relation to systems not employing carrier aggregation, embodiments of the invention will now be described relating to a system employing carrier aggregation. With carrier aggregation (CA) a user equipment may be configured with multiple carriers. A user equipment may be configured with intra-frequency measurements on each of these 'serving frequencies'. In addition, the user equipment may be configured with inter-frequency measurements e.g. comparing a configured Component Carrier (CC)/serving frequency with a non-configured component carrier/neighbouring frequency.

For example, a user equipment may be configured to use the following configuration: frequency f1 is used as primary component carrier, while frequency f2 is used as secondary component carrier. The user equipment performs intra-frequency measurements on both f1 and f2, and the user equipment performs an inter-frequency measurement on f3, i.e. comparing the serving cell on f1 with neighbouring cells on f3.

Figure 6:
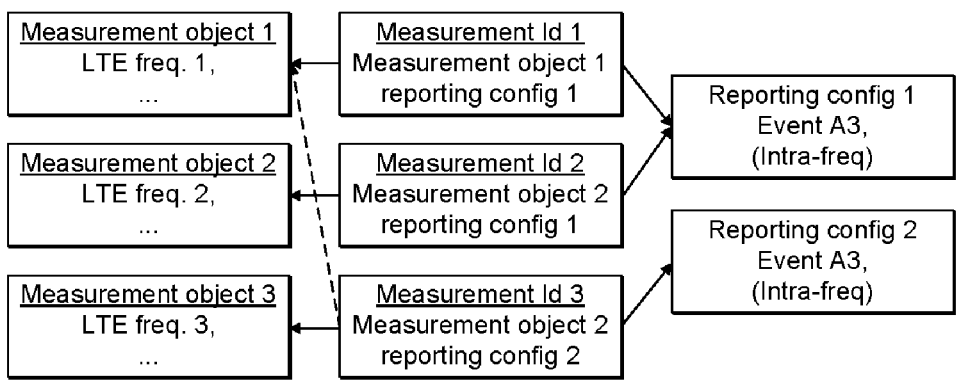
FIG. 6 is a schematic diagram showing an example of a measurement configuration as an embodiment of the invention.

Embodiments of the invention may relate to carrier aggregation (CA) as follows. A link to two objects may be needed to indicate both the serving frequency and the neighbouring frequency. Since there are also other ways to indicate the serving frequency, a dotted line is used in the FIG. 6 that illustrates this particular configuration. FIG. 6 shows an example of an LTE measurement configuration with CA as an embodiment of the invention.

Without carrier aggregation, the user equipment is typically only connected to one cell, on one frequency, i.e. on one carrier. With the arrival of carrier aggregation this changes i.e. the user equipment may be connected to one Primary Component Carrier (PCC) and one or more Secondary Component Carriers (SCC's).

Embodiments of the invention may address the following issues: whether the primary component carrier should be changed, and if so, which node will determine which component carrier becomes the new primary component carrier; what will be done with the secondary component carrier's, i.e. should they be continued, released or replaced by other component carriers; and what will be done with the measurement configuration that is configured at the user equipment at such a CA-handover.

A conventional, non-carrier aggregation handover sequence has several limitations in relation to systems employing carrier aggregation.

Firstly, regarding user equipment measurement reporting, in any measurement report (step 2 of the handover sequence shown above) the user equipment may report only measurement results related to cells on one object/frequency/component carrier. This may not provide the network with information necessary for deciding how to handle other component carriers.

Secondly, regarding determination of target cells and carriers used after handover, the source-eNB may decide on the target cell and may provide no further measurement information to the target eNB in steps 4 & 6 of the handover sequence shown in FIG. 6. With carrier aggregation, it is conventionally not defined who/how the target cell(s) are determined, who/how the new primary component carrier is determined, and who/how the additional secondary component carrier's are determined.

Thirdly, regarding autonomous measurement configuration update by user equipment, "object swapping" may be specified for source and target frequencies in single-carrier operation.

Embodiments of the inventions may address these indicated handover-related problems. In embodiments of the invention, swapping may take place in configurations with multiple carriers, while some might be continued, some might be added and some might be removed upon handover.

Regarding user equipment measurement reporting, in embodiments of the invention, in addition to measurement results related to cells on the carrier that triggered the measurement report, also measurement results obtained on additional LTE carriers may be configured to be included in a measurement report.

According to a first embodiment, EUTRAN may configure the user equipment by means of a single on/off indicator within the reporting configuration of a measurement whether the user equipment may include all frequencies the user equipment is currently measuring. If set, the user equipment may include for each concerned frequency the best cell as well as the available measurement result for that cell. If multiple quantities are available for the concerned cell, the user equipment may simply include them all. If the user equipment is configured to perform multiple measurements for a particular frequency, with different trigger quantities, we still preferably need to define what quantity the user equipment uses to determine which cell is best. In the first embodiment the system employs a simple on/off control to determine whether a measurement report should contain additional frequencies. The simplest would be to fix a measurement quantity (such as received signal power or received signal quality) in the configuration of the user equipment, for example by including a specification of the quantity in the equipment specification, for example for the case that different quantities are configured for the concerned frequency, the user equipment determines the best cell according to the Reference Signal Received Power (RSRP) quantity. It may also be specified that in such a case the user equipment reports the measurement result for the RSRP quantity only, that is to say the measurement quantity relates to received signal power, rather than for both quantities, the second quantity relating to received signal quality. According to the first embodiment, the user equipment may provide measurement information for all frequencies that the user equipment is currently measuring, so as to avoid the need for the user equipment to perform additional measurements, so that there is additional reporting, but may not be additional measurements performed. The additional measurement reporting may indicate the best cell(s) on each frequency that the user equipment has measured. If the user equipment performs a measurement on a frequency that does not allow the user equipment to determine the strongest cell on that frequency, the concerned frequency should, in an embodiment of the invention, not be part of the additional measurement reporting. This applies for example for measurements that only concern the serving cell, such as measurements known as an "event A1 type".

Measurements that allow the user equipment to determine the strongest cell on a frequency include the following, for example: firstly, measurements of type "A3", which may be used to determine if there are neighbouring cells on a particular frequency which measured quantity is an offset better than that of the source cell (i.e. the configured cell) on the same frequency; secondly, measurements of type event "A4", which may be used to determine if there are neighbouring cells on a particular frequency for which the measured quantity is above a specified threshold configured for that component carrier; and thirdly, measurements of type event "A5", which may be used to determine if both the measured quantity of the serving cell (i.e. the configured cell) on a particular frequency is below a first threshold while at the same time there is a neighbouring cell on the same frequency for which the measured quantity is above another threshold.

A trigger may be generated at the user equipment in dependence on a measurement result relating to a carrier frequency that is measured by the user equipment. Dependent on the trigger and receiving a message from the network comprising an indicator, a message containing a measurement report may be sent from the user equipment to the wireless access network. The measurement report may relate to at least to a carrier frequency other than the carrier frequency on which the trigger is based. That is to say, carrier frequencies used or potentially used for carrier aggregation may be included in the measurement report, but triggering of the report may be based on one of the carriers only in an embodiment of the invention.

The indicator may indicate that the measurement report is required to relate to at least a carrier frequency other than the first carrier frequency, that is to say that the indicator may indicate that measurements relating to carrier aggregation may be required. The measurement report will typically comprise measurements of carrier frequencies that the user equipment is configured to measure, that is to say that typically the measurement report will make use of measurements that the user equipment is configured to measure before it received a request for a measurement report from the network. The measurement report may exclude one or more carrier frequencies at which it has been determined that a best cell may not be identified, since it may be that the information on such frequencies is not useful in support of handover. The exclusion may be based on whether signals are measured at least in a neighbouring cell, since if measurements are only performed on a serving cell it may not be possible to indentify a best cell. Accordingly, the measurement report may exclude one or more carrier frequencies for which signals are measured only from a serving cell.

In some embodiments, the measurement report comprises measurements of all carrier frequencies that the user equipment is configured to measure, since this is a simple scheme to implement with a minimum of signalling. The user equipment may determine a selected cell, such as a best cell for each carrier frequency included in said measurement report. This information may be useful in support of handover. The selected cell for each carrier frequency may be determined on the basis of a measurement of a determined measurement quantity, typically received signal power or received signal quality. The quantity configured at the user equipment may be used, but if more than one measurement quantity is configured at the user equipment for a respective carrier frequency, then a quantity based on received signal power may be used as a default. This may be pre-set into the user equipment.

Several selected cells for a carrier frequency may be determined on a basis of measurements of the determined measurement quantity, and the selected cells may be included in the measurement report in an order derived from measurements of the determined measurement quantity, for example, the best cells may be included first. This information may be useful in supporting handover.

In embodiments of the invention, the indicator may comprise an indication of carrier frequencies for which the user equipment is required to include measurements in the measurement report.

The indicator may include an indication of a number of selected cells to be included in the measurement report, the number of selected cells for a respective carrier frequency being the number of cells or fewer. That is to say, for example, the measurement report may be required to include up to some number of best cells per carrier frequency.

A measured carrier frequency is not necessarily configured for use for communication between the user equipment and the wireless access network. For example, a carrier frequency may be a candidate for future use for communication.

The user equipment may be configured such that said measurement report comprises measurements of a first quantity and not of a second quantity, that is to say measurements may be for example of received power, or received signal quality. This may be based on using an existing configuration of the user equipment to determine whether the measurement report comprises measurements of a first quantity or a second quantity. Alternatively, the indicator may indicates a measurement quantity that is required by the wireless access network.

The user equipment may receive a message comprising an indication of a threshold and send a message including the measurement report in dependence on the measurement result exceeding the threshold.

According to a second embodiment, when EUTRAN configures the user equipment, by means of an indicator in a message sent to the user equipment, to perform additional measurement reporting, the user equipment provides measurement information of the best cell(s) of each frequency on which the user equipment is configured to perform a measurement allowing the user equipment to determine the strongest cell of the frequency.

In embodiments of the invention, some more enhanced control options may implemented, for example as follows. In each case, an indicator may be received at the user equipment indicating the measurement configuration required at the user equipment.

According to a third embodiment, EUTRAN may configure which of the frequencies that the user equipment is configured to measure, should be included in a measurement report, that is to say which frequencies may provide the requested additional measurement information.

According to a fourth embodiment, EUTRAN may configure a number N, in which case the user equipment may, if for a frequency measured results are available for multiple cells, only provide the additional measurement information for the N best cells.

According to a fifth embodiment, EUTRAN may configure a quantity, in which case the user equipment may, if multiple quantities are available, only provide the concerned quantity as part of the additional measurement information.

According to a sixth embodiment, EUTRAN may configure a threshold, in which case the user equipment may only provide the additional measurement information for cells which measured result exceeds the threshold.

It should be noted that the 'additional measurement reporting' may be useful in cases and scenarios other than intra-LTE handover.

Considering determination of carriers used after handover, in systems not employing carrier aggregation, the target cell frequency and "L1" identity are typically inputs to the security key that the source eNB prepares for the target eNB. Since the source eNB selects the target cell and thus knows the identity (specifically the "L1" identity) and frequency of the target cell, this information is freely available to the source cell. In addition this information is also available to the user equipment after handover, so the user equipment can perform the same security derivation.

In order to enable a similar derivation in systems employing carrier aggregation, it is preferable that the source eNB may be aware of at least one cell that is configured after handover so that it can use the L1 identity and frequency of that cell as input for the security key derivation. The user equipment should preferably also be aware of the selected cell so that it can use the same inputs for the security key derivation. It may not be preferable to use a L1 identity/frequency from a cell not configured after handover since this may enable a malicious source eNB to manipulate the key derivation for keys used in a target eNB.

Handover is preferably triggered by the fact that the user equipment reports a better cell than currently configured which makes the source eNB decide that a handover needs to be performed. In systems not employing carrier aggregation, the eNB may initiate handover based on a single measurement, reflecting that a neighbouring cell becomes better than the serving cell on one of the frequencies/component carriers configured for the user equipment, i.e. the eNB may use one frequency/component carrier as reference for handover. Furthermore, the eNB may configure the solutions listed in the previous discussion for problem 1, to obtain additional information regarding all frequencies/component carriers. Thus, based on the user equipment measurement report(s), the source eNB should be in a good position to determine a sensible primary carrier after handover, i.e. continue on the current primary component carrier or change to another one.

According to an embodiment of the invention, the source eNB may decide what the primary component carrier will be after handover and which cell will be used on that primary component carrier. The source eNB indicates the target cell and selected primary component carrier to the target eNB as part of the handover preparation.

The source eNB might not have a complete overview of the resource situation and load of the potential handover target cells/frequencies. It may not be beneficial for the source eNB to determine which carriers are to be configured as secondary component carrier's after handover.

According to an embodiment of the invention, the target eNB may decide which frequencies to configure as secondary component carrier after handover.

According to an embodiment of the invention, the source eNB may pass the measurement information obtained from the user equipment (as for example in the first to sixth embodiments described above) to the target eNB during handover preparation.

With respect to which cell to select on the secondary component carriers, embodiments may employ at least two options: firstly, the source may select the target cell based on the measurement information reported by the user equipment; and secondly, the target may select the target cell, using measurement information forwarded by the source eNB.

The first option may imply that the source eNB only needs to provide measurement information regarding the target cell, while the second option may imply that the source eNB needs to provide measurement information of multiple cells on the concerned frequencies. The latter also affects the measurement reporting by the user equipment, i.e. the user equipment may also need to report on multiple cells to accommodate the second option. Accordingly, the second option may involve additional signalling and additional complexity, but makes it possible to take, for example, cell load into account when deciding which cell to use. The first and second options may be embodied as follows.

According to an embodiment of the invention, the source eNB selects the target cell also on frequencies that are measured by the user equipment other than the one that is assigned the role of primary component carrier. That is to say, for frequencies that are not allocated the role of primary component carrier, the source eNB may select the target cell.

In this case the source eNB preferably only provides measurement information for the target cells on each frequency to assist the target to decide which frequencies to configure as secondary component carrier. The source may either forward the measured results provided by the user equipment, or provide the measurement information implicitly i.e. by means of the order of the targets (frequency, cell combinations) included in the handover preparation information e.g. best target first.

In an embodiment of the invention, the source eNB may only provide measurement information, as obtained from the user equipment, for the selected target cell. According to a second option, the target eNB may select the target cell on the frequencies that are measured by the user equipment other than the one that is assigned the role of primary component carrier, that is to say The source eNB may provide measurement information, as obtained from the user equipment, for one or more potential target cells on the concerned frequencies.

According to the first or second options, the eNB may provide the measurement information implicitly i.e. by ordering entries in the list of potential targets. In case of option b, the order would involve two levels i.e. first at the level of frequencies and next at the level of cells on a frequency.

According to an embodiment of the invention, the source eNB may provide the measurement information implicitly i.e. by means of the order of the listed targets (frequency, cell combinations) included in the handover preparation information e.g. the best target appears first in the list.

It should be noted that the first and second options may be used alongside one another i.e. the source may select cells on some frequencies while the target select cells on other frequencies e.g. the ones on which no measurement information was provided by the user equipment.

Regarding autonomous measurement configuration update by user equipment, the primary component carrier may be the most important component carrier for mobility management. This can be seen in view of an assumption that typically only when the radio connection on the primary component carrier is lost, the user equipment will perform a re-establishment. When the same happens for other component carriers (secondary component carriers), no drastic actions may be taken because communication on the primary component carrier can still continue. To prevent loosing the connection on the primary component carrier, preferably the intra-frequency measurements on the primary component carrier, if configured, are continued immediately after the handover. In view of this, according to an embodiment of the invention, the user equipment and the target eNB preferably perform autonomous object swapping upon handover and re-establishment when multiple carriers are configured.

According to an embodiment of the invention, for intra-frequency measurements, upon handover and re-establishment, the UE and the target eNB preferably autonomously re-link any measurement identity linked to the measurement object corresponding with the primary component carrier before handover (i.e. "old primary component carrier"), to the measurement object corresponding with the primary component carrier after handover (i.e. "new primary component carrier").

As a variant of the above embodiment of the invention, for intra-frequency measurements, upon handover and re-establishment, the UE and the target eNB preferably autonomously re-link any measurement identity linked to the object corresponding with the new primary component carrier, to the measurement object corresponding with the old primary component carrier.

For the inter-frequency measurements, object swapping may be performed in embodiments of the invention, that is to say for inter-frequency measurements on any component carrier for which the neighbour frequency becomes serving frequency object swapping is preferably performed i.e. the measurement is re-linked to the previous serving frequency. Preferably, the object swapping may be applied if the concerned frequencies are swapped, that is to say there was a measurement comparing a serving/configured component carrier ('old serving') with a not-configured component carrier, the 'old serving' becomes a not configured component carrier, and the old not-configured component carrier becomes a serving/configured component carrier.

The combined embodiments can be illustrated by the example illustrated in FIG. 6, for which the following typically applies.

Before handover, the user equipment is preferably configured to use the following configuration: frequency f1 is used as primary component carrier, while frequency f2 is used as secondary component carrier; and the user equipment performs intra-frequency measurements on both f1 and f2; and the user equipment performs an inter-frequency measurement on f3, i.e. comparing the serving on f1 with f3.

A handover is performed, preferably resulting in the following configuration: frequency f3 is used as primary component carrier, while frequency f2 remains configured as secondary component carrier; the user equipment performs intra-frequency measurements on both f2 and f3; and the user equipment performs an inter-frequency measurement on f1, i.e. comparing the serving on f3 with neighbours on f1.

In this case, object swapping may be performed as follows: the intra-frequency measurement on f1 (old primary component carrier) is re-linked to f3 (new primary component carrier), according to embodiments 3.2 and 3.3; and the inter-frequency measurements comparing the serving on f1 with neighbours on f3 is re-linked so it compares the serving on f3 with neighbours on f1.

Figure 7:
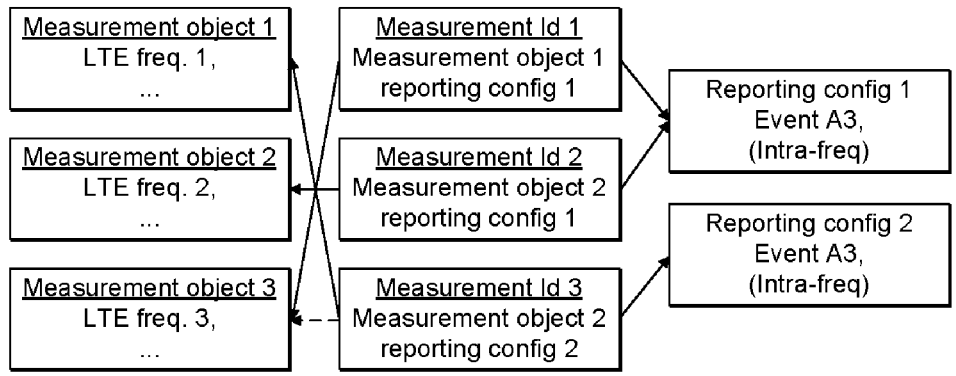
FIG. 7 is a schematic diagram showing an example of a measurement configuration after an autonomous update as an embodiment of the invention.

FIG. 7 shows Example LTE measurement configuration with CA, after object swapping.

It may be advantageous to limit further autonomous updating performed by the user equipment, i.e. there may be no need to specify re-linking related to other secondary component carriers or other carriers, that is to say the user equipment and the target eNB preferably do not perform autonomously re-linking other than covered by the previous embodiments. EUTRAN preferably applies explicit signalling to perform any reconfigurations for these frequencies/carriers.

Figure 8:
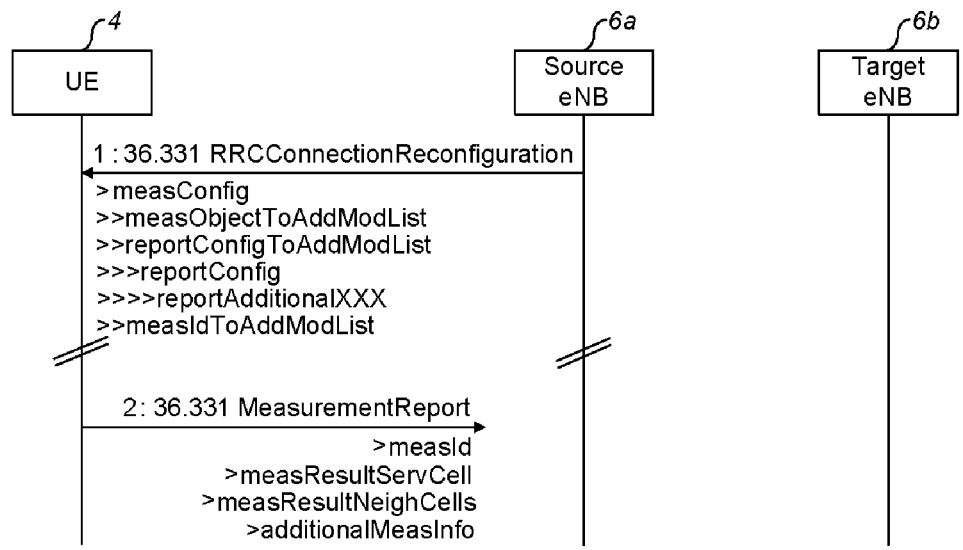
FIG. 8 is a schematic diagram showing signalling in an embodiment of the invention.

FIG. 8 provides an overview of an embodiment of a message exchange upon measurement configuration and the subsequent measurement reporting. It should be noted that this is for the purposes of illustration and other embodiments are possible, so that embodiments are not limited to the specific messages illustrated by FIG. 8.

Referring to FIG. 8, the source eNB preferably configures the user equipment to perform measurement reporting by sending the RRCConnectionReconfiguration message including the field measConfig, at step 1.

Embodiments of the invention include part of an entry of the reportConfigToAd-dModList, as follows.

Firstly, reportAdditionalFreqInfo: this has a field indicating whether or not the user equipment may provide the additional measurement information of all frequencies the user equipment is configured to measure, as in the first or second embodiment, or a field indicate for which of the frequencies the user equipment is configured to measure, the user equipment may provide the additional measurement information, as in the third embodiment.

Secondly, reportAdditionalMaxCells: if included the user equipment may report the N best cells, with the limit N indicated by this field. If not included, the user equipment may report the best cell only.

Thirdly, reportAdditionalQuant: if included and if the user equipment has measurement results available for more than one quantity, the user equipment may only report the results for the quantity indicated by this field.

Fourthly, reportAdditionalThresh: if included, the user equipment may only provide additional measurement information for cells of which the measured result exceeds the threshold indicated by this field.

At step 2 of FIG. 8, when the triggering condition for a measurement for which additional measurement reporting is configured is met, the user equipment may send a MeasurementReport message including the additional information. Fields of the measurement report may include additionalMeasInfo: the user equipment may includes measurement results for a list of frequencies, with the best frequency listed first, and for each frequency, the user equipment may include measurement results for a list of one or more cells, with the best frequency listed first. For each cell, the user equipment may include either nothing (i.e. when no measurement information is needed other than the order), or the available measured results for one or more quantities.

Figure 9:
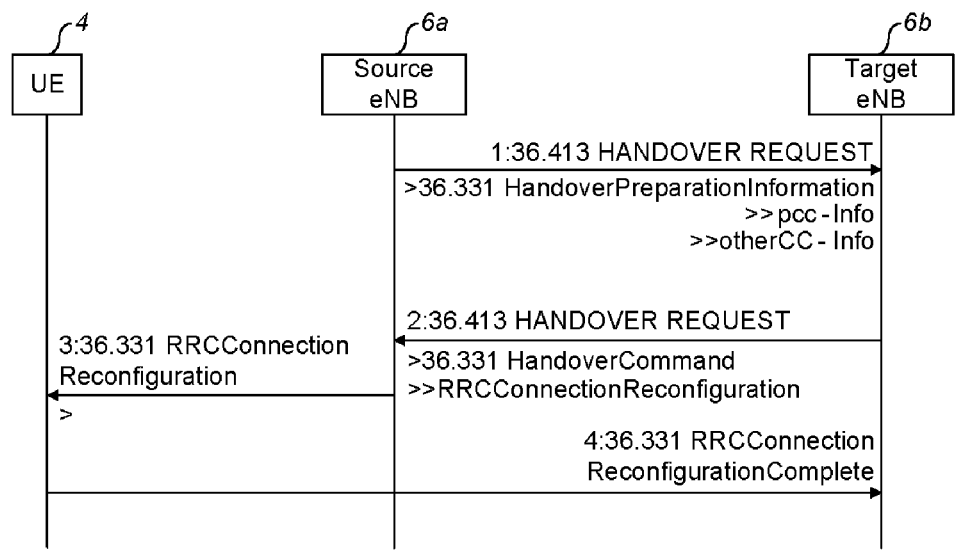
FIG. 9 is a schematic diagram showing signalling in an embodiment of the invention.

FIG. 9 provides an overview of the messages exchange upon handover in an embodiment of the invention. It should be noted that the messages shown are for illustrative purposes and embodiments of the invention are not limited to the use of the messages shown.

The source eNB preferably initiates the handover procedure, at step 1, by sending the HANDOVER REQUEST message to the target eNB. The message preferably includes the HandoverPreparationInformation message, which is extended in REL-10 to support continued use of multiple component carriers for user equipments configured with CA.

The source eNB preferably decides which frequency to configure as primary component carrier as well as the target cell on this frequency.

For other frequencies, the source eNB preferably either indicates the target cell or provides measurement information for the best cells on the frequency. The measurement results are provided per frequency, with the best frequency (i.e. ranked according to the best cell on the frequency) listed first.

The field of the first step of FIG. 9 "pcc-Info" preferably indicates which frequency is used as primary component carrier as well as the target cell on this frequency. This indication may be provided by existing field e.g. the Target cell ID (ECGI) as used in EUTRAN signalling;

The field "otherCC-Info" may, according to the first option as referred to above, include the target cell, that is to say it provides for a number of frequencies. Specifically, it may provide the target cell identity, and may provide measurement information for the target cell, which could be implicitly i.e. by means of the order in which the frequencies are listed i.e. best target first.

Alternatively, according to option 2 as described above, the field "otherCC-info" may not include the target cell. It may provide for a number of frequencies. The field may provide measurement information for one or more potential target cells, which could be implicitly i.e. by means of the order in which the frequencies are listed i.e. best target first.

Upon receiving the HANDOVER REQUEST message the target eNB preferably performs admission control, reserves resources in the target cell and prepares the RRC-ConnectionReconfiguration message. The target eNB includes the RRCConnectionReconfiguration message in the HANDOVER REQUEST ACK message, which it returns to the source eNB at step 2 of FIG. 9.

According to embodiments of the invention, the target eNB configures the frequency (and the corresponding cell) indicated by the source as primary component carrier. The target eNB decides which frequencies to configure as secondary component carrier, taking into account the information provided by the source eNB.

The target eNB may prepare a RRCConnectionReconfiguration message accordingly and forwards this to the source eNB which forwards it to the user equipment. Upon receiving an RRCConnectionReconfiguration message the user equipment may initiate handover towards the indicated target cell on the primary component carrier as well as on secondary component carrier(s). As part of this procedure, the user equipment may perform a reconfiguration in accordance with the fields included by the target eNB in the RRCConnectionReconfiguration message. Preferably, the handover is considered successful if the user equipment successfully completes the random access procedure on the primary component carrier.

Upon successfully establishing the connection with the target cell the user equipment preferably sends the RRCConnectionReconfigurationComplete message.

Figure 10:
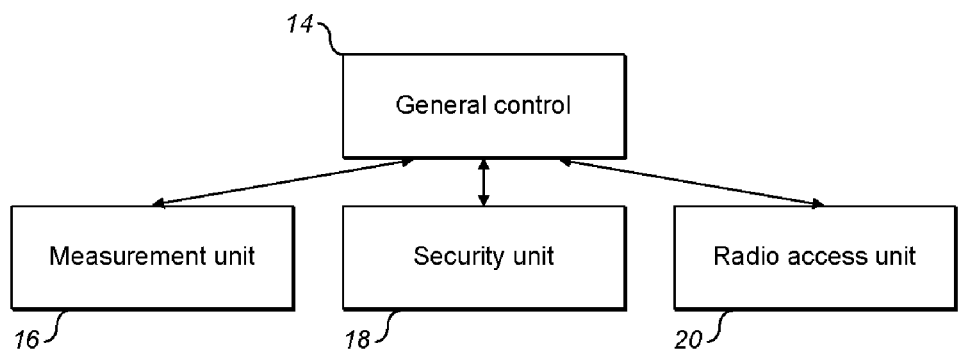
FIG. 10 is a schematic diagram showing functional blocks of a user equipment.

FIG. 10 shows a high level model of a user equipment. The following briefly describes the operation of functional blocks according to embodiments of the invention. General control may handle the layer 3 protocol i.e. receiving, processing as well as preparation and sending of Radio Resource Control (RRC) messages. The measurement unit may perform the measurements that are configured by EUTRAN. The security unit may perform the integrity protection for Signalling Radio Bearers (SRBs), the ciphering for all Radio Bearers (RBs) as well as the associated key derivations. The radio access unit may handle the layer 1 and 2 of the radio access protocols.

Specifically, the functional blocks may operate as follows in embodiments of the invention. The general control unit may handle the reception of the new fields within the reportConfigToAddModList and may configure the Measurement unit to report additional measurement information. The measurement unit may be affected in terms of information reported towards the general control unit. In the case that additional measurement reporting is configured, the measurement unit may include measurement information regarding additional frequencies in a report provided to the general control unit.

Figure 11:
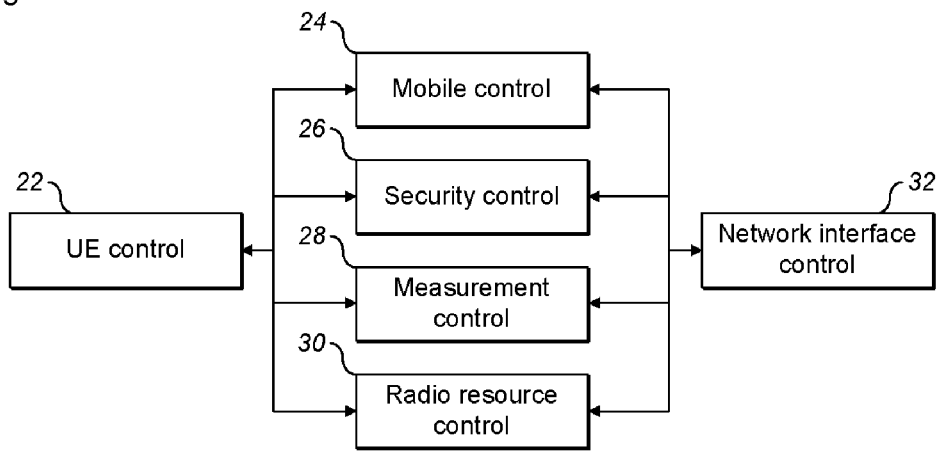
FIG. 11 is a schematic diagram showing functional blocks of a wireless access node.

FIG. 11 shows a high level model of a eNB. The following briefly describes at least which functional blocks may be affected by embodiments of this invention: the user equipment control may handle the layer 3 radio access protocol i.e. receiving, processing as well as preparation and sending of Radio Resource Control (RRC) messages; the Network interface control may handle the similar functions for network interfaces; the measurement control may handle the configuration of the measurements functions in the user equipment and the eNB; the security control may handle the configuration of the security functions of the radio access i.e. integrity protection and the ciphering; and the radio resource control may handle the configuration of layer 1 and 2 of the radio access protocols.

Embodiments of the invention may affect a number of functional blocks of an eNB as follows. The user equipment control unit may handle the sending of the new fields within the reportConfigToAddModList as well as the reception of the additional measurement information within a MeasurementReport message, as well as the associated interactions with the measurement control unit and the mobility control unit. The network interface control may handle the sending of the new fields within the HandoverPreparationInformation message (source side) as well as the reception of these fields (target side), as well as the associated interactions with the Mobility control unit (e.g. target side: deciding which secondary component carriers to configure) and the measurement control unit (e.g. target side: object swapping). Regarding the mobility control unit, the source side may decide the primary component carrier and selects the target cell on the concerned frequency. Furthermore, the source provides additional information regarding other component carriers (target cell, measurement information, possibly implicit). The target side decides which frequencies to configure as secondary component carrier (and possibly which cells to use on these frequencies). The target side also verifies the successful completion of the handover (primary component carrier is established successfully). Regarding the measurement control unit, the source side may decide when to configure the user equipment to provide additional measurement information. Furthermore, the target eNB performs the swapping of the measurement configuration.

Embodiments of the invention may relate to handover, as shown in the message sequence diagram of FIG. 9, but embodiments of the invention may also apply upon connection re-establishment. The handover preparation preceding connection re-establishment is similar to that for a handover. That is to say, the information provided from source to target with respect to primary component carrier and secondary component carrier is the same. The user equipment may initiate the re-establishment on any cell under the same target eNB i.e. including cells on a frequency that is not selected as primary component carrier by the source eNB. However, it may however be assumed that, like upon connection establishment, the target re-establishes radio communication on a single frequency only. The concerned frequency can be regarded as a primary component carrier. In this case, measurement and radio resource configurations for other component carriers are temporarily suspended, and all related configuration parts remain kept and used as basis for the delta in the first subsequent re-configuration message. Similar measurement object swapping to that performed upon handover is also performed upon re-establishment. This also results in an updated measurement configuration for 'suspended' component carriers.

Embodiments of the invention may have one or more of the following advantages. Firstly, the option to make the user equipment include measurement information of other frequencies than the one that triggered the report introduces a general means for supporting a large variety of mobility scenario's without introducing any specifics e.g. different triggering criteria optimized for specific deployment cases. The additional measurement reporting makes it possible to continue the use of multiple/the most suitable component carriers immediately following a handover. Enhanced controls can be introduced to further tune/optimize the information provided by the user equipment e.g. indication of the frequencies, the number of cells, the reporting quantity, a minimum threshold.

Secondly, a mechanism may be specified that preserves the existing handover and security principles. Regarding the primary component carrier as the primary frequency/cell (corresponding with a particular network node and defining the inputs used for security key derivation), that is to be decided by the source while the secondary component carrier is regarded as an additional radio resource and hence decided by the target eNB. Different signaling options are covered e.g. implicitly signaling the measurement information by the order within the list.

Thirdly, embodiments of the invention may specify a mechanism covers Carrier Aggregation. The main aspect is that the intra-frequency measurements on the primary component carrier are continued, i.e. these measurements are regarded as most important since the concerned frequency plays an essential role in the communication. For all component carriers a similar object swapping may be proposed as for non-carrier aggregation systems. This is less important for maintaining the radio connection, but may help to reduce the signalling overhead.

In embodiments of the invention, the source eNB 6a may select the target cell on each frequency and decide which frequency becomes Primary Component Carrier. The target eNB 6b may decide which frequencies to configure as Secondary Component Carrier. The source eNB 6a may provide measurement information for multiple frequencies to the target eNB 6b, which the target eNB 6b can use this when deciding which frequencies to configure as Secondary Component Carrier. The network, that is to say EUTRAN, may configure the user equipment 4 to include measurement results of measured frequencies other than the one that triggered the sending of the report, that is to say additional frequency results. The user equipment 4 and target eNB 6b may change the measurement configuration with respect to the linking of measurement objects, to facilitate continuation of measurements on the frequency assigned as primary component carrier with minimal signalling i.e. the user equipment may swap the objects of the previous and new primary component carrier, while the linking of other objects is unchanged (i.e. EUTRAN uses explicit signalling). The above enables EUTRAN to configure the UE with a suitable set of primary component carrier and secondary component carriers, which are applicable immediately after the handover.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of a source base station, the method comprising:
    receiving a measurement report including measurement results for one primary cell (PCell) and one or more secondary cells (SCells) from the terminal;
    determining whether to perform the handover of the terminal based on the measurement report;
    transmitting candidate cell information to the target base station if the source base station determines the handover of the terminal, the candidate cell information including a list of best cells on each frequency for which measurement information is available; and
    transmitting a control message associated with the handover of the terminal to the terminal,
    wherein the control message includes information on the target base station.

2. The method of claim 1, wherein one or more SCells to be configured for use after handover of the terminal for the target base station are determined by the target base station.

3. The method of claim 1, wherein a PCell for the target base station is selected by the source base station.

4. The method of claim 1, wherein the candidate cell information further comprises signal measurement information.

5. The method of claim 4, wherein a list of the candidate cell information is arranged in order of strength of signal measurement information of each cell.

6. The method of claim 1, wherein the candidate cell information is related to one or more SCells for the target base station.

7. A source base station comprising:
    a transceiver configured to transmit and receive a signal; and
    a controller configured to:
        receive a measurement report including measurement results for one primary cell (PCell) and one or more secondary cells (SCells) from a terminal, determine whether to perform the handover of the terminal based on the measurement report, transmit candidate cell information to the target base station if the source base station determines the handover of the terminal, the candidate cell information including a list of best cells on each frequency for which measurement information is available, and transmit a control message associated with the handover of the terminal to the terminal, wherein the control message includes information on the target base station.

8. The source base station of claim 7, wherein one or more SCells to be configured for use after handover of the terminal for the target base station are determined by the target base station.

9. The source base station of claim 7, wherein a PCell for the target base station is selected by the source base station.

10. The source base station of claim 7, wherein the candidate cell information further comprises signal measurement information.

11. The source base station of claim 10, wherein a list of the candidate cell information is arranged in order of strength of signal measurement information of each cell.

12. The source base station of claim 7, wherein the candidate cell information is related to one or more SCells for the target base station.

13. A method of a target base station, the method comprising:

receiving candidate cell information from a source base station of a terminal, the candidate cell information including a list of best cells on each frequency for which measurement information is available;

determining one or more secondary cells (SCells) to be configured for use after the handover of the terminal;

receiving a message associated with the handover from the terminal;

performing a handover procedure of the terminal based on the message; and transmitting activation information for one or more SCells of the target base station from the target base station.

14. The method of claim 13, wherein a primary cell (PCell) for the target base station is selected by the source base station of the terminal.

15. The method of claim 13, wherein the candidate cell information further comprises signal measurement information.

16. The method of claim 15, wherein a list of the candidate cell information is arranged in order of strength of signal measurement information of each cell.

17. The method of claim 13, wherein the candidate cell information is related to the one or more SCells for the target base station.

18. A target base station comprising:

a transceiver configured to transmit and receive a signal; and a controller configured to:

receive candidate cell information from a source base station of a terminal, the candidate cell information including a list of best cells on each frequency for which measurement information is available, determine one or more secondary cells (SCells) to be configured for use after the handover of the terminal, receive a message associated with the handover from the terminal, perform a handover procedure of the terminal based on the message, and transmit activation information for one or more SCells of the target base station from the target base station.

19. The target base station of claim 18, wherein a primary cell (PCell) for the target base station is selected by the source base station of the terminal.

20. The target base station of claim 18, wherein the candidate cell information further comprises signal measurement information.

21. The target base station of claim 20, wherein a list of the candidate cell information is arranged in order of strength of signal measurement information of each cell.

22. The target base station of claim 18, wherein the candidate cell information is related to the one or more SCells for the target base station.

23. A method of a terminal, the method comprising:

transmitting a measurement report including measurement results for one primary cell (PCell) and one or more secondary cells (SCells) to a source base station;

receiving a first message associated with the handover of the terminal from the source base station;

transmitting a second message associated with the handover of the terminal to a target base station; and receiving activation information for one or more SCells for the target base station after the handover of the terminal, from the target base station, wherein the first message includes information on the target base station, wherein the measurement results are used to generate candidate cell information for cells by the source base station, and wherein the candidate cell information includes a list of best cells on each frequency for which measurement information is available.

24. The method of claim 23, wherein a PCell for the target cell is selected by the source base station.

25. The method of claim 23, wherein the one or more SCells to be configured for use after handover of the terminal for the target base station are determined by the target base station.

26. The method of claim 23, wherein the measurement report comprises candidate cell information for the target base station.

27. The method of claim 26, wherein the candidate cell information further comprises signal measurement information.

28. The method of claim 23, wherein information included in the measurement report is related to the one or more SCells for the target base station.

29. A terminal comprising:

a transceiver configured to transmit and receive a signal;

a controller configured to:

transmit a measurement report including measurement results for one primary cell (PCell) and one or more secondary cells (SCells) to a source base station, receive a first message associated with the handover of the terminal from the source base station, transmit a second message associated with the handover of the terminal to a target base station, and receive activation information for one or more SCells of the target base station after the handover of the terminal, from the target base station, wherein the first message includes information on the target base station, wherein the measurements results are used to generate candidate cell information by the source base station, and wherein the candidate cell information includes a list of best cells on each frequency for which measurement information is available.

30. The terminal of claim 29, wherein a PCell for the target cell is selected by the source base station.

31. The terminal of claim 29, wherein the one or more SCells to be configured for use after handover of the terminal for the target base station are determined by the target base station.

32. The terminal of claim 29, wherein the measurement report comprises candidate cell information for the target base station.

33. The terminal of claim 32, wherein the candidate cell information further comprises signal measurement information.

34. The terminal of claim 29, wherein information included in the measurement report is related to the one or more SCells for the target base station.

* * * * *